US012683641B2

(12) United States Patent
Purnamasidi et al.

(10) Patent No.: US 12,683,641 B2
(45) Date of Patent: Jul. 14, 2026

(54) TRANSCEIVER PROTECTION DEVICE

(71) Applicant: AMD Design, LLC, Wilmington, DE (US)

(72) Inventors: Justin Widodo Purnamasidi, Atlanta, GA (US); Jie Ren, Little Falls, NJ (US)

(73) Assignee: AMD Design, LLC, Wilmington, DE (US)

( * ) Notice: Subject to any disclaimer, the term of this patent is extended or adjusted under 35 U.S.C. 154(b) by 341 days.

(21) Appl. No.: 18/358,103

(22) Filed: Jul. 25, 2023

(65) Prior Publication Data

US 2025/0038783 A1    Jan. 30, 2025

(51) Int. Cl.
H04B 1/3888        (2015.01)
H04B 1/08          (2006.01)

(52) U.S. Cl.
CPC ........... H04B 1/3888 (2013.01); H04B 1/088 (2013.01)

(58) Field of Classification Search
CPC ........ H04B 1/3888; H04B 1/088; H04B 1/03; H04B 1/08; H04M 1/0203; H04M 1/02
See application file for complete search history.

(56) References Cited

U.S. PATENT DOCUMENTS

| | | | | |
|---|---|---|---|---|
| 6,522,765 B1 * | 2/2003 | Towle | .................. | H04R 1/1033 |
| | | | | 381/384 |
| 8,272,790 B2 * | 9/2012 | Belsan | ................. | G02B 6/4284 |
| | | | | 398/135 |
| 2008/0247762 A1 * | 10/2008 | Yoshikawa | .......... | G02B 6/4277 |
| | | | | 398/138 |
| 2008/0287170 A1 * | 11/2008 | Huang | ................ | H04M 1/0283 |
| | | | | 455/575.7 |
| 2010/0284657 A1 * | 11/2010 | Rosch | .................. | G02B 6/4284 |
| | | | | 385/92 |
| 2011/0065321 A1 * | 3/2011 | Wang | ................... | H01R 31/005 |
| | | | | 439/620.01 |
| 2016/0057518 A1 * | 2/2016 | Neudorf | ............... | G02B 6/4292 |
| | | | | 398/45 |
| 2019/0211577 A1 * | 7/2019 | Gharabegian | .......... | H02K 11/35 |
| 2022/0222388 A1 * | 7/2022 | Teeter | .................. | G02B 6/4246 |

* cited by examiner

*Primary Examiner* — Andrew Wendell
(74) *Attorney, Agent, or Firm* — SCULLY, SCOTT, MURPHY & PRESSER, P.C.

(57)        ABSTRACT

A transceiver protection device includes a body operable to be coupled with a cable. The cable is operable to be coupled, via a connector of the cable, to a transceiver. A detach component is operable to receive a detach force to detach the cable from the transceiver. The detach component extends from the body such that the detach component is adjacent to the transceiver when the cable is coupled with the transceiver. A catch component extends from the body. The catch component is operable to be received in an aperture formed by a hanger of the transceiver.

20 Claims, 10 Drawing Sheets

TRANSCEIVER PROTECTION DEVICE

FIELD

The present disclosure relates generally to a transceiver protection device operable to be installed with a fiber optic cable coupled with a transceiver.

BACKGROUND

Transceivers are hung from the ceiling via a fiber optic cable. This can cause a huge potential for drops and therefore damage to the transceiver. Dropping of the transceiver is a common occurrence.

BRIEF DESCRIPTION OF THE DRAWINGS

Implementations of the present technology will now be described, by way of example only, with reference to the attached figures, wherein.

DETAILED DESCRIPTION

Figure 1:
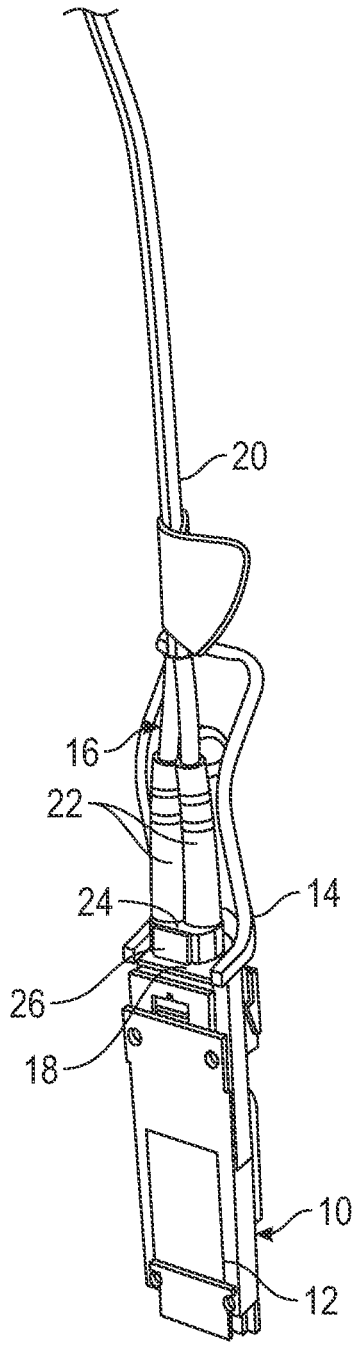
FIG. 1 illustrates a transceiver suspended by a cable.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented. The term "coupled" is defined as connected, whether directly or indirectly through intervening components, and is not necessarily limited to physical connections. The term "substantially" is defined to be essentially conforming to the particular dimension, shape or other word that substantially modifies, such that the component need not be exact. For example, substantially cylindrical means that the object resembles a cylinder, but can have one or more deviations from a true cylinder. The term "about" means reasonably close to the particular value. For example, about does not require the exact measurement specified and can be reasonably close. As used herein, the word "about" can include the exact number. The term "near" as used herein is within a short distance from the particular mentioned object. The term "near" can include abutting as well as relatively small distance beyond abutting. The terms "comprising," "including" and "having" are used interchangeably in this disclosure. The terms "comprising," "including" and "having" mean to include, but not necessarily be limited to the things so described.

Transceivers are hanging from the ceiling via a fiber optic cable causing huge potential for drops and therefore damage to the transceiver. A damaged transceiver increases test cell downtime by at least two weeks due to reordering and receiving a new transceiver. Large numbers of transceivers are utilized for test cells, so the delay as well as reordering new transceivers can lead to substantial increased costs.

For example, FIG. 1 illustrates a conventional transceiver 10 being hung from a cable 20 (for example a fiber optic cable). The transceiver 10 includes a housing 12 and a hanger 14 that extends from the housing 12. The hanger 14 forms an aperture 16.

The cable 20 includes one or more ends 22 that are operable to be inserted into and/or coupled to a connector 24. The connector 24 is operable to be releasably coupled with the transceiver 10 by being inserted into a corresponding port 18 formed in the housing 12 of the transceiver 10. The connector 24 can include a retaining latch 26 that is operable to maintain the coupling of the connector 24 with the transceiver 10.

To detach the transceiver 10 from the cable 20, a detach force can be imparted on the retaining latch 26 to release the connector 24 from the port 18. In at least one example, the retaining latch 26 can be compressed. Unless the retaining latch 26 receives the detach force, the transceiver 10 can remain coupled to the cable 20. However, as many transceivers 10 are suspended or hung from the cables 20 (for example from the ceiling or rafters), if there is a malfunction with the retaining latch 26 the transceiver 10 may fall and be damaged. Also, in some examples, as the retaining latch 26 is separated away from the housing 12 of the transceiver 10, once the retaining latch 26 is triggered or malfunctions, no holding force has to be applied to the transceiver 10 to separate the transceiver 10 from the cable 12 which can lead to the transceiver 10 falling and being damaged. For example, a user detaching the transceiver 10 from the cable 10 may impart the detach force to the retaining latch 26. However, the user does not have to hold onto the housing 12 of the transceiver 10 for the transceiver 10 to separate from the cable 20. Accordingly, there is a large potential for the transceiver 10 to be dropped and damaged.

Figure 2B:
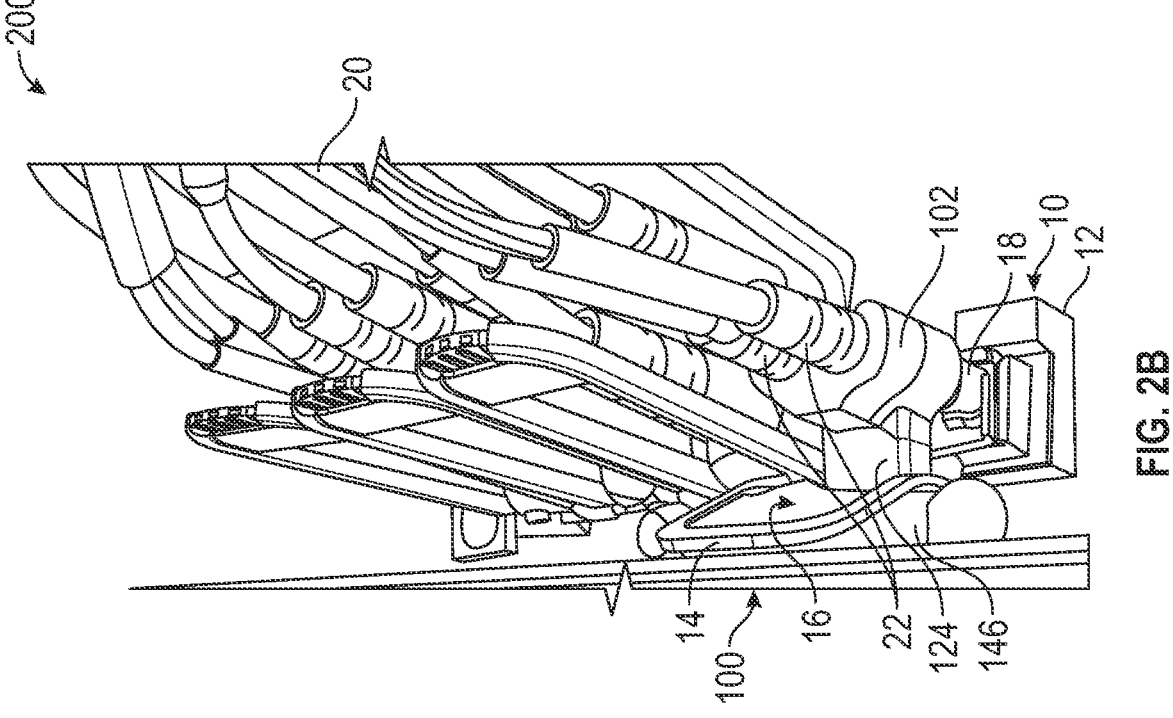
FIG. 2B illustrates the transceiver coupled with the cable and the transceiver protection device in a rack environment.
Figure 2A:
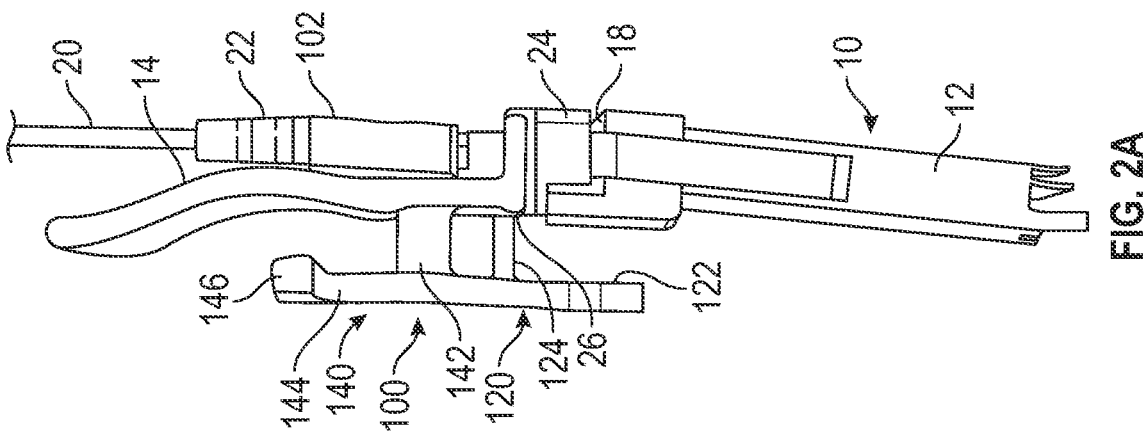
FIG. 2A illustrates a transceiver suspended by a cable with a transceiver protection device coupled to the cable.

Referring to FIGS. 2A and 2B, a transceiver protection device 100 can be coupled with the cable 20 to prevent the undesired drop and damage of the transceiver 10. The transceiver protection device 100 can include a body 102 that receives and couples with the cable 20, for example the ends 22. For example, the body 102 can receive the ends 22, and as the ends 22 increase in diameter and/or width as the ends 22 approach the connector 24, a portion of the ends 22 proximate to the connector 24 is larger than the receiving portions 104 of the body 102. Accordingly, the ends 22 are securely received in the body 102 of the transceiver protection device 100. The cable 20, coupled with the body 102, is operable to be coupled, via a connector 24 of the cable 22, to the transceiver 10. In some examples, the connector 24 abuts against the body 102 and prevents the cable 20 from further movement in relation to the body 102, and the cable 20 is then retained within and coupled with the body 102 of the transceiver protection device 100.

A detach component 120 is operable to receive a detach force (e.g., from a user) to detach the cable 20 from the transceiver 10. The detach component 120 extends from the body 102 such that the detach component 120 is adjacent to the transceiver 10 (e.g., the body 12 of the transceiver 10) when the cable 20 is coupled with the transceiver 10.

A catch component 140 can extend from the body 102. The catch component 140 can be operable to be received in an aperture 16 formed by the hanger 14 of the transceiver 10.

In at least one example, as shown in FIG. 2B, the transceiver protection device 100 can be utilized in a transceiver environment 200. In at least one example, the transceiver environment 200 can include a rack that includes a plurality of transceivers 10. The transceiver protection device 100 can be coupled with the cable 20 which is coupled with the transceiver 10. Accordingly, even in a crowded rack environment 200 with a plurality of transceivers 10, the transceiver protection device 100 can be utilized without any modification to the transceiver 10, the cable 20, and/or the transceiver environment 200. As such, the transceiver protection device 100 can be retrofit to the cable 20 and the transceiver 10, without requiring any modification to the cable 20 and/or the transceiver 10.

FIGS. 3A-3D illustrate the transceiver protection device 100. As discussed above, the transceiver protection device 100 can include a body 102 that forms one or more receiving portions 104 operable to receive the cable 20, for example the ends 22 of the cable 20. In at least one example, the receiving portions 104 can have a radius 104R (shown in FIG. 3C) between about 1.5 millimeters and about 4 millimeters. In some examples, the radius 104R can be between about 2 millimeters and about 3.5 millimeters. IN some examples, the radius 104R can be about 2.90 millimeters. The radius 104R of the receiving portions 104 can be sized to receive at least a portion of the end 22 of the cable 20. As the end 22 of the cable 20 increases in diameter (or width) towards the connector 24, when the diameter (or width) of the end 22 surpasses the radius 104R of the receiving portions 104, the end 22 is securely received in and coupled with the body 102 of the transceiver protection device 100.

In at least one example, the body 102 can have a length 102L between about 8 millimeters and about 24 millimeters. In some examples, the length 102L can be between about 12 millimeters and about 22 millimeters. In some examples, the length 102L can be about 16 millimeters.

The detach component 120 extends from the body 102. The detach component 120 includes a push component 122. The push component 122 is operable to receive the detach force (e.g., from the user) to detach the transceiver 10 from the cable 20 (e.g., the connector 24). In at least one example, the detach component 120 includes a vertical extension 121 that extends along a longitudinal axis of the transceiver protection device 100. In at least one example, the push component 122 can be formed as a portion of the vertical extension 121. The push component 122 can be formed at an end of the vertical extension 121 (e.g., opposite the end coupled with the body 102).

The detach component 120 includes a push portion 124 operable to impart the detach force against the connector 24 of the cable 20 to detach the cable 20 from the transceiver 10. In at least one example, the push portion 124 can extend from the vertical extension 121 of the detach component 120. The push portion 124 can extend substantially transverse from the vertical extension 121. The push portion 124 can be positioned to align with the retaining latch 26 of the connector 24 to detach the cable 20 from the transceiver 10. For example, when the detach component 120 receives the detach force, the vertical extension 121 and/or the push component 122 bends and/or flexes so that the push portion 124 abuts against and pushes against the retaining latch 26. The retaining latch 26 then releases the transceiver 10 to detach the transceiver 10 from the cable 20.

In at least one example, the push component 122 can extend substantially perpendicular from the longitudinal axis of the vertical extension 121. The vertical extension 121 extends from the body 102 in a direction away from the body 102 so that the vertical extension 121 and/or the push component 122 are adjacent to the transceiver 10 when the cable 20 is coupled with the transceiver 10. Accordingly, the push component 122 is adjacent to the transceiver 10, and when the push component 122 receives the detach force, the user is required to hold onto the transceiver 10. For example, when the user applies the detach force onto the push component 122, the push component 122 is pushed towards and/or against the body 12 of the transceiver 10. To gain the leverage to apply the detach force onto the push component 122, the user must push against the opposing side of the body 12 of the transceiver 10 which forces the user to hold and/or grip the transceiver 10. Accordingly, when the transceiver 10 is detached from the cable 20, the user already has a hold on the transceiver 10 which can prevent the transceiver 10 from falling and being damaged.

In some examples, the vertical extension 121 can have a width 121W between about 5 millimeters and about 13 millimeters. In some examples, the width 121W can be between about 6 millimeters and about 10 millimeters. In some examples, the width 121W can be about 8.50 millimeters.

In some examples, the push component 122 can have a width 122W between about 5 millimeters and about 35 millimeters. In some examples, the width 122W can be between about 12 millimeters and about 28 millimeters. In some examples, the width 122W can be between about 15 millimeters and about 22 millimeters. In some examples, the width 122W can be about 19.50 millimeters.

The catch component 140 includes a hook that is operable to receive the hanger 14 of the transceiver 10. Accordingly, if the transceiver 10 is detached from the cable 20 without a user holding the transceiver 10, the catch component 140 is operable to catch the hanger 14 of the transceiver 10 to prevent the transceiver 10 from falling and being damaged.

In at least one example, the catch component 140 includes a horizontal arm 142 that extends from the body 102. A vertical arm 144 can extend at an angle from the horizontal arm 142. In at least one example, the horizontal arm 142 and the vertical arm 144 can form the hook to receive the hanger 14 of the transceiver 10. In at least one example, the angle can be between about 20 degrees and about 160 degrees. In some examples, the angle can be between about 50 degrees and about 130 degrees. In some examples, the angle can be between about 70 degrees and about 110 degrees. In some examples, the angle can be about 90 degrees. The angle is sufficient so that the hanger 14 can be received in the hook formed by the horizontal arm 142 and the vertical arm 144, and the hanger 14 is not undesirably released from the catch component 140. Accordingly, the catch component 140 can catch and retain the hanger 14 if the transceiver 10 is detached from the cable 20 without being held. The transceiver 10 can then hang from the catch component 140 of the transceiver protection device 100 (and the cable 20) until the transceiver 10 is safely removed from the transceiver protection device 100, for example by a user, to avoid damage to the transceiver 10.

In at least one example, the detach component 120, for example the vertical extension 121, can extend from the catch component 140. For example, as illustrated in FIGS. 3A-3D, the vertical extension 121 can extend from the horizontal arm 142 of the catch component 140. In some examples, the vertical extension 121 can extend from the horizontal arm 142 in a direction away from (e.g., opposite from) the vertical arm 144. The vertical extension 121, in some examples, can extend from the horizontal arm 142 at the same angle as the vertical arm 144. In some examples, the vertical extension 121 can extend from the horizontal arm 142 about 90 degrees. In some examples, the push portion 124 can extend from the vertical extension 121 substantially parallel to the horizontal arm 142.

In at least one example, the catch component 140 includes a transverse arm 146 that extends transverse from the vertical arm 144. The transverse arm 146 can assist in retaining the hanger 14 in the catch component 140. For example, the transverse arm 146 can have a width 146W that is wider than the width of the hanger 14 and/or the aperture 16. Accordingly, the hanger 14 cannot be released from the catch component 140 without user assistance, preventing the undesired falling and/or damage to the transceiver 10 when detached from the cable 20. In at least one example, the width 146W of the transverse arm 146 can be between about 15 millimeters and about 45 millimeters. In some examples, the width 146W can be between about 20 millimeters and about 40 millimeters. In some examples, the width 146W can be between about 25 millimeters and about 35 millimeters. In some examples, the width 146W can be about 30 millimeters.

In some examples, as illustrated in FIGS. 3A-3D, the transverse arm 146 can include ends 148 formed at each end of the transverse arm 146. The ends 148 can have a width and/or diameter greater than the width and/or diameter of the transverse arm 146. The ends 148 can be formed substantially as spheres with a flat end. In some examples, the ends 148 can be formed substantially as spheres. The ends 148 can assist in preventing the undesired release of the hanger 14 of the transceiver 10 from the catch component 140.

Figure 3A:
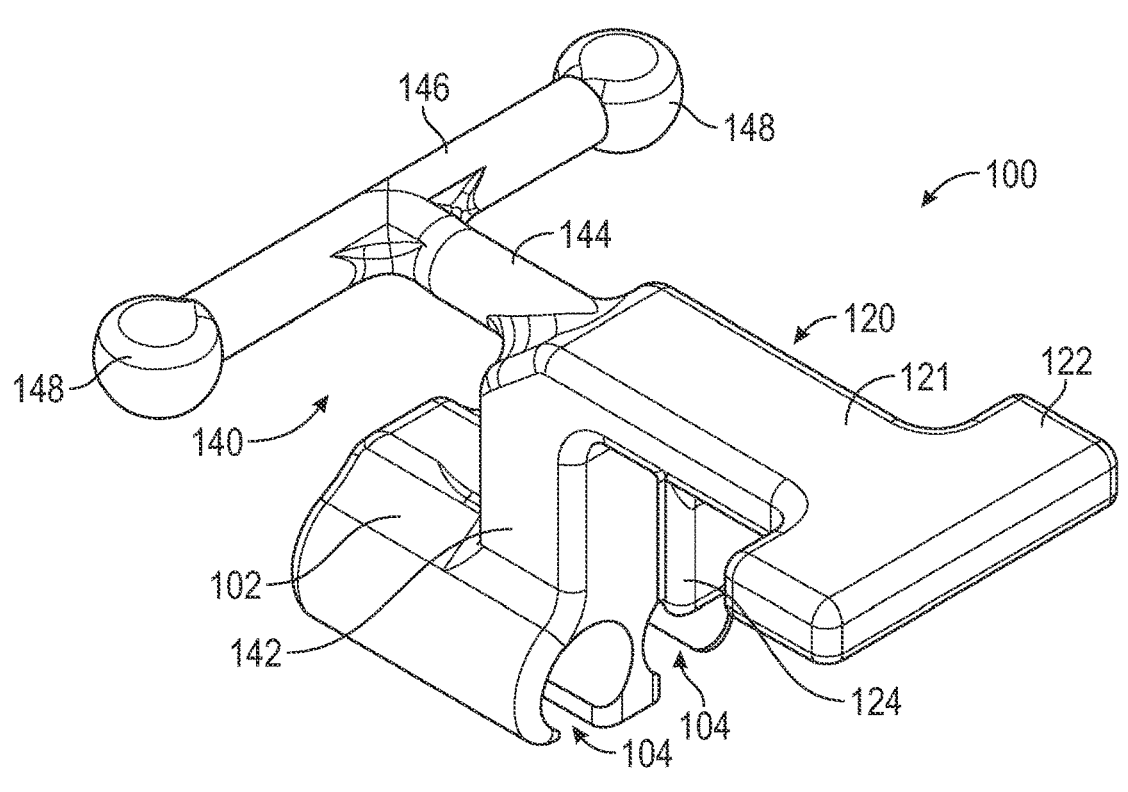
FIG. 3A illustrates a perspective view of the transceiver protection device.
Figure 3B:
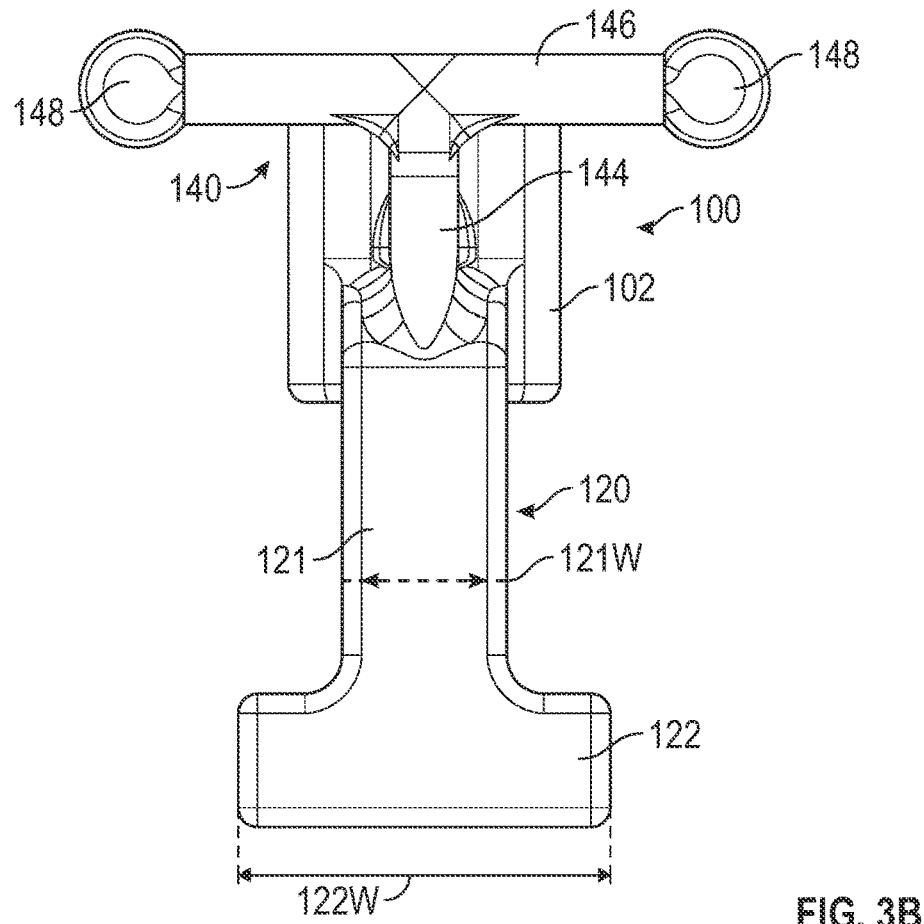
FIG. 3B illustrates a front view of the transceiver protection device.
Figure 3C:
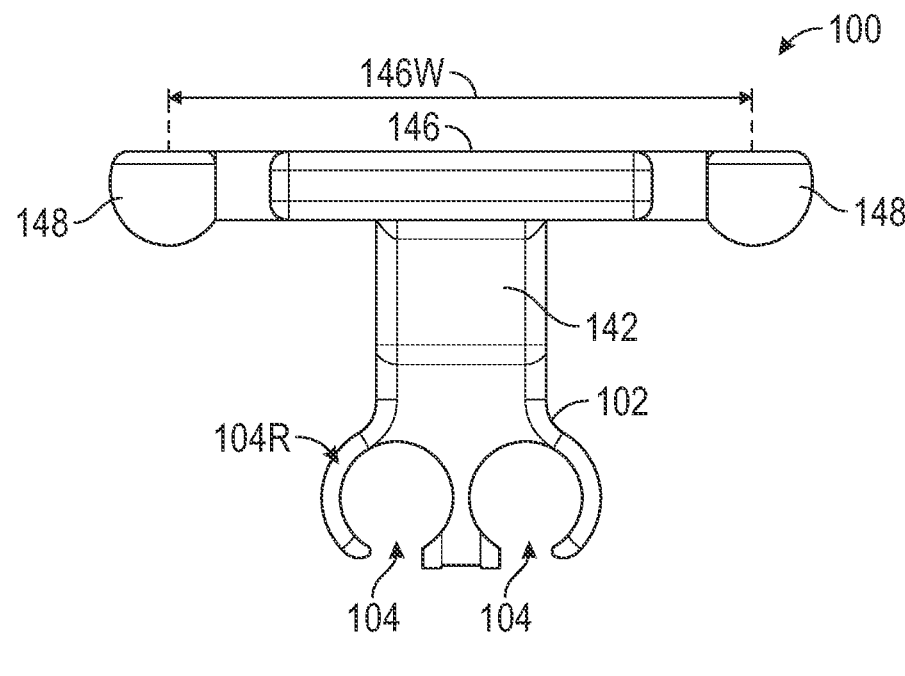
FIG. 3C illustrates a top view of the transceiver protection device.
Figure 3D:
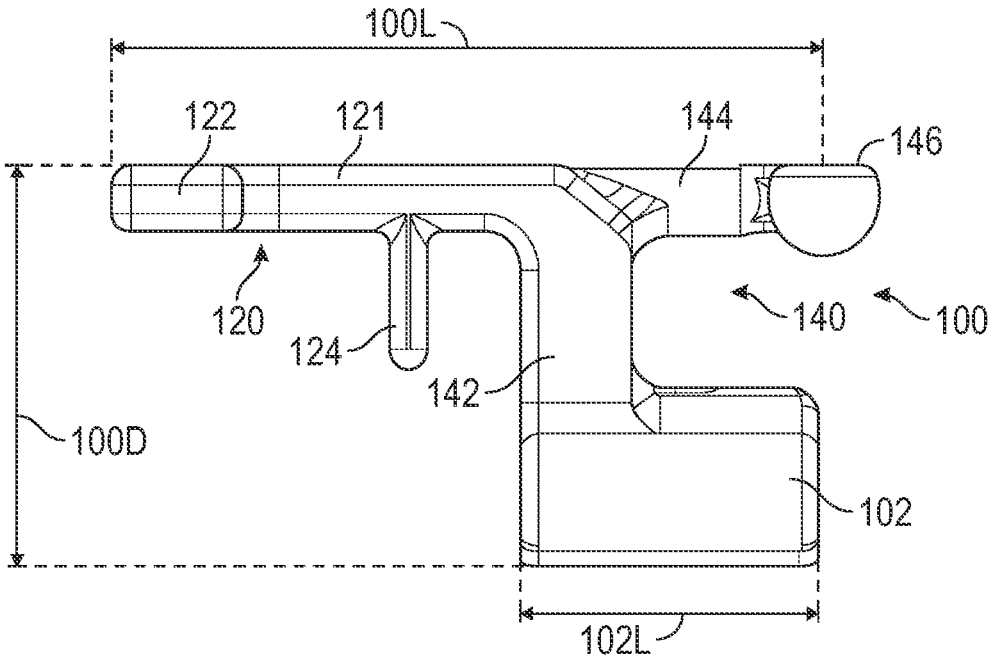
FIG. 3D illustrates a side view of the transceiver protection device.

Referring to FIG. 3D, the transceiver protection device 100 can have a length 100L that spans from the transverse arm 146 to the bottom of the detach component 120 (e.g., the push component 122) between about 20 millimeters and about 60 millimeters. In some examples, the length 100L can be between about 30 millimeters and about 48 millimeters. In some examples, the length 100L can be between about 35 millimeters and about 43 millimeters. In some examples, the length 100L can be about 38.29 millimeters.

The transceiver protection device 100 can have a depth 100D spanning from the detach component 140 to the body 102 between about 10 millimeters and about 30 millimeters. In some examples, the depth 100D can be about 15 millimeters and about 25 millimeters. In some examples, the depth 100D can be about 21.51 millimeters.

Figure 4A:
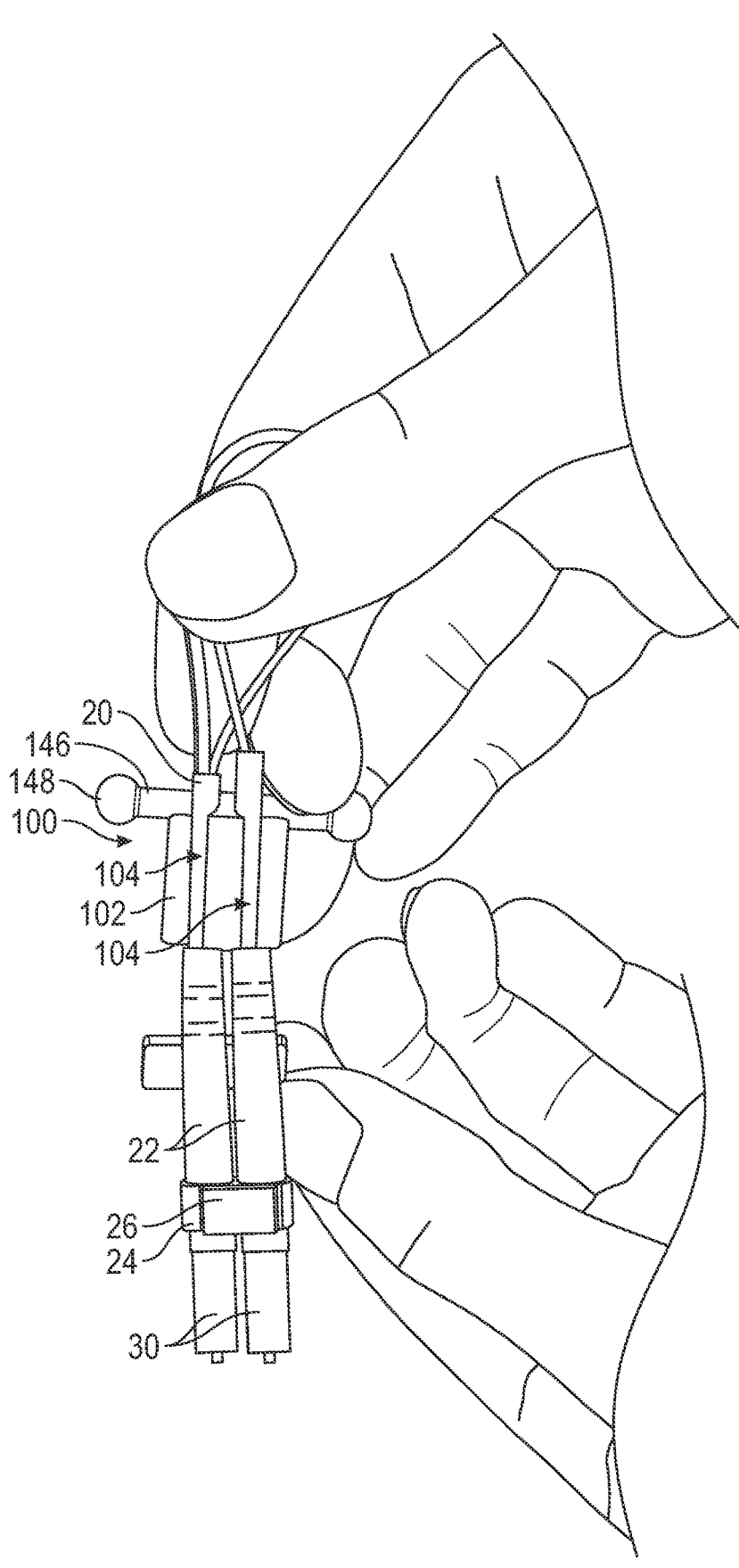
FIGS. 4A and 4B illustrate coupling the cable with the transceiver protection device.
Figure 4B:
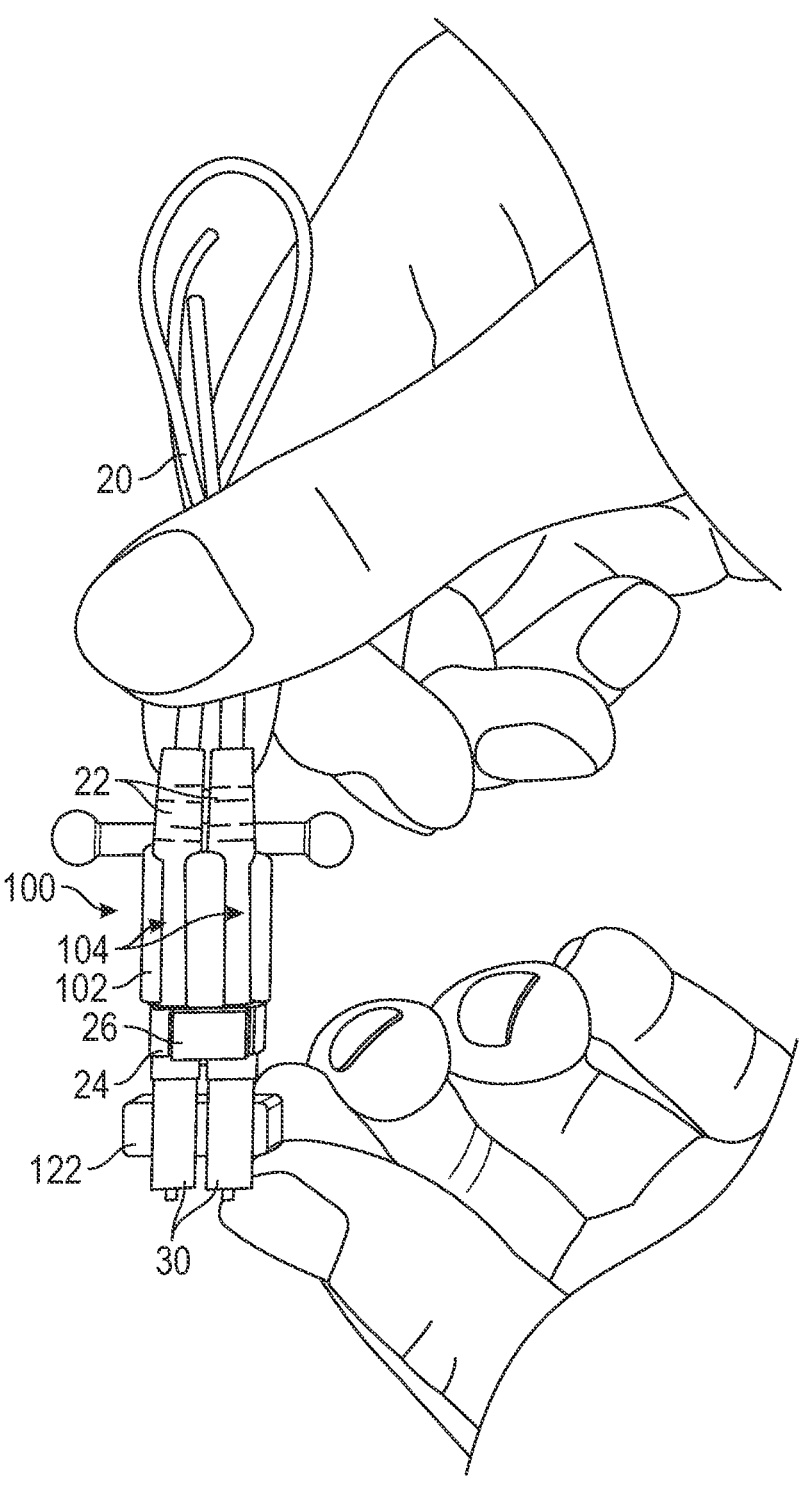

FIGS. 4A and 4B illustrate coupling the cable 20 with the transceiver protection device 100. The cable 20 can be inserted into the receiving portions 104 of the body 102. The cable 20 can then be pulled in relation to the transceiver protection device 100 so that the connector 24 is moved towards the body 102 while the cable 20 is received in the body 102. In some examples, the connector 24 abuts against the body 102 and prevents the cable 20 from further movement in relation to the body 102, and the cable 20 is then retained within and coupled with the body 102 of the transceiver protection device 100. In some examples, as the ends 22 increase in diameter and/or width as the ends 22 approach the connector 24, a portion of the ends 22 proximate to the connector 24 is larger than the receiving portions 104 of the body 102. Accordingly, the ends 22 are securely received in the body 102 of the transceiver protection device 100, and the transceiver protection device 100 is coupled with the cable 20. The cable 20, coupled with the body 102, is operable to be coupled, via the plugs 30 of the connector 24, to the transceiver 10.

As can be seen in FIG. 4B, when the transceiver protection device 100 is securely coupled with the cable 20, the push component 122 of the detach component 120 extends past the connector 24. Accordingly, to impart the detach force onto the push component 122, the user must push against and/or hold the opposing side of the transceiver 10, preventing the transceiver 10 from inadvertent drops when being detached from the cable 20.

Figure 4D:
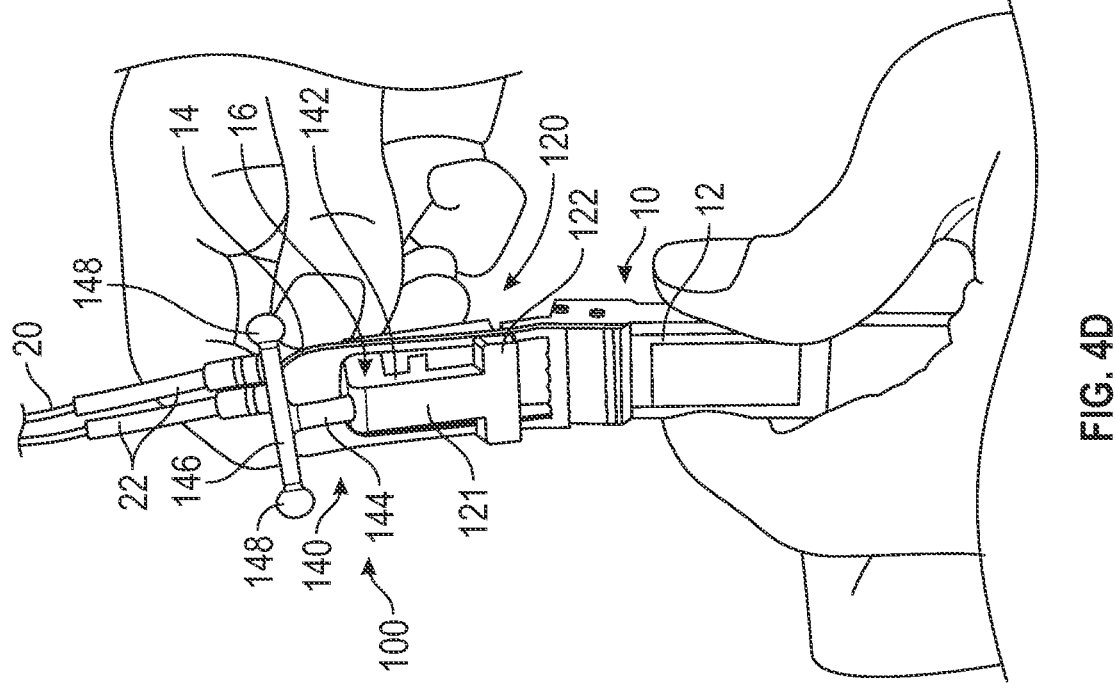
FIGS. 4C, 4D, and 4E illustrate coupling the cable with the transceiver protection device with the transceiver.
Figure 4C:
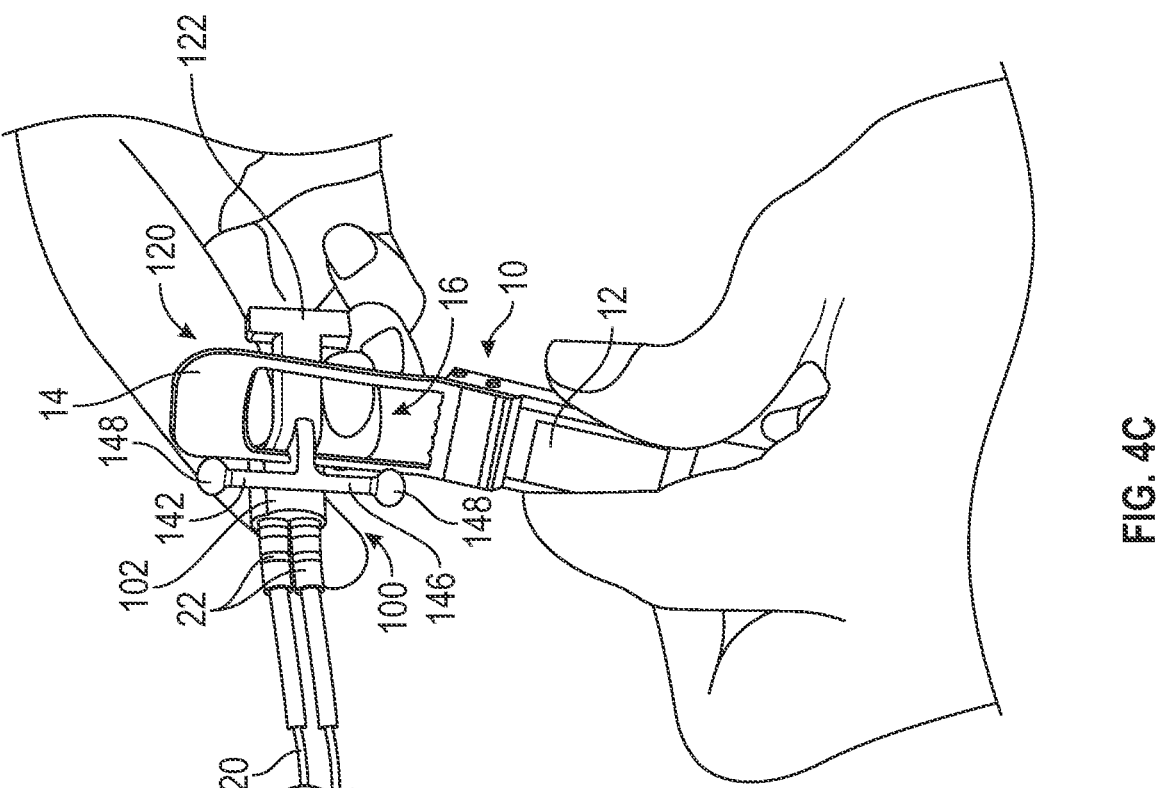
Figure 4F:
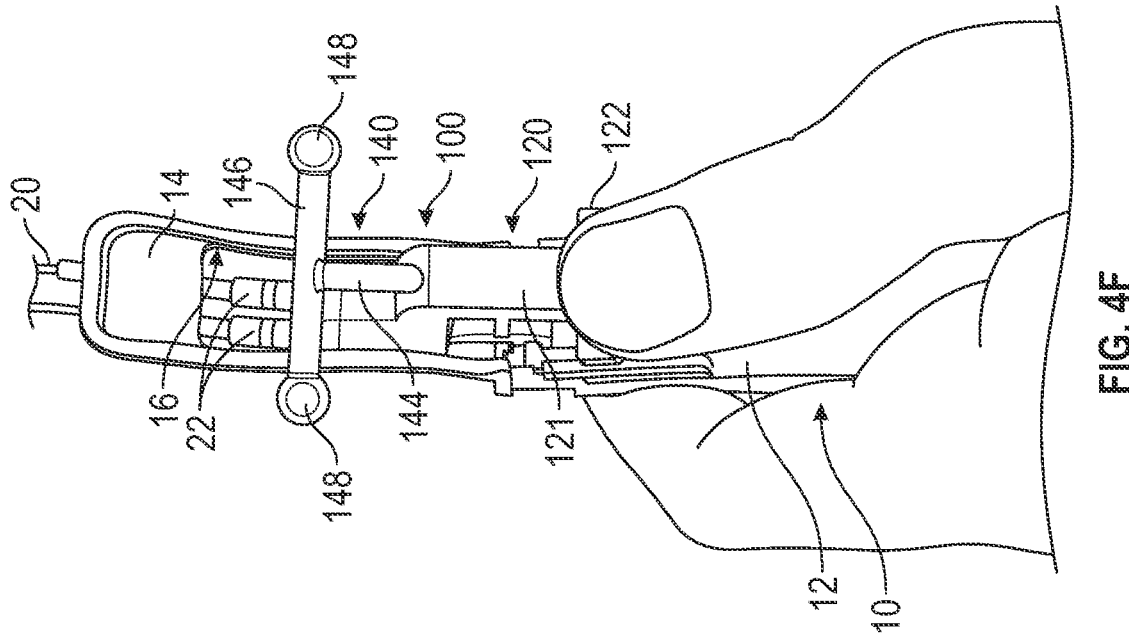
FIGS. 4F and 4G illustrate detaching the cable with the transceiver protection device from the transceiver.
Figure 4E:
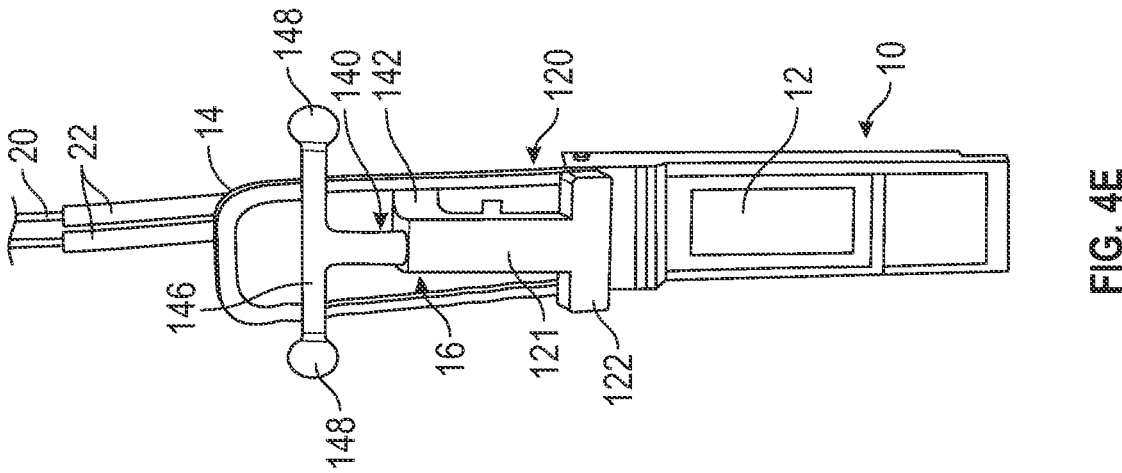

FIGS. 4C, 4D, and 4E illustrate coupling the cable 20 with the transceiver protection device 100 with the transceiver 10. As illustrated in FIG. 4C, the catch component 140 (e.g., the transverse arm 146 and the vertical arm 144) is inserted through the aperture 16 of the hanger 14. As illustrated in FIG. 4D, the cable 20 with the transceiver protection device 100 is repositioned to align the connector 24 of the cable 20 with the transceiver 10. While repositioned, the hanger 14 is received in the hook formed by the horizontal arm 142 and the vertical arm 144 of the catch component 140. As illustrated in FIG. 4E, the connector 24 of the cable 20 is coupled with the transceiver 10. When the transceiver 10 is coupled with the cable 20, the hanger 14 is received in the catch component 140 to prevent undesired falling and damage of the transceiver 10 if detached.

Figure 4G:
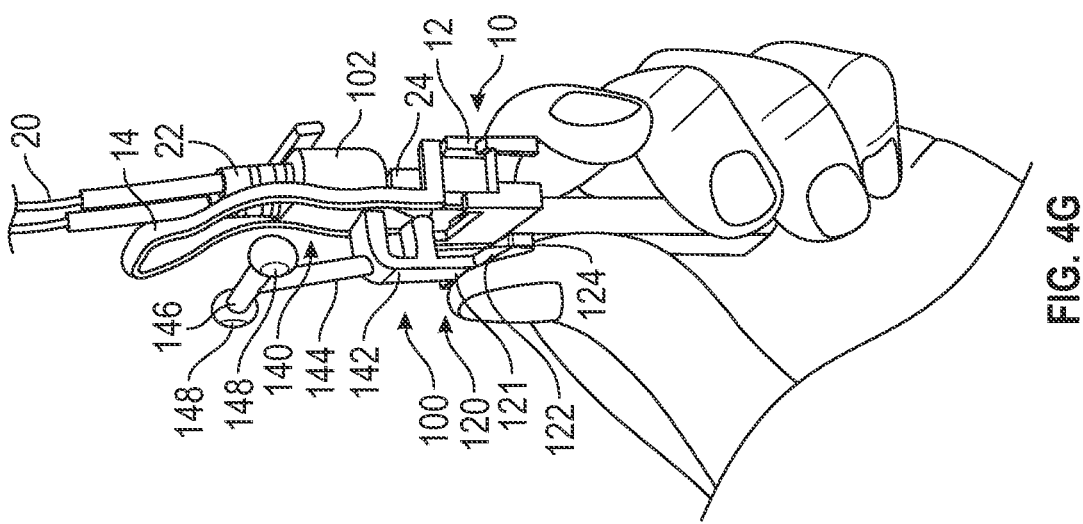

FIGS. 4F and 4G illustrate detaching the cable 20 with the transceiver protection device 100 from the transceiver 10. As illustrated in FIG. 4F, to detach the transceiver 10 from the cable 20, the user imparts a detach force against the detach component 120 (e.g., the push component 122). As the push component 122 of the detach component 120 is adjacent to the body 12 of the transceiver 10, to impart the detach force, the user must push against the opposing side of the body 12 of the transceiver 10. In doing so, as illustrated in FIG. 4G, the user has a hold on the transceiver 10. This can prevent the transceiver 10 from undesirably falling and being damaged when detached, as the user already has a hold on the transceiver 10.

Figure 5:
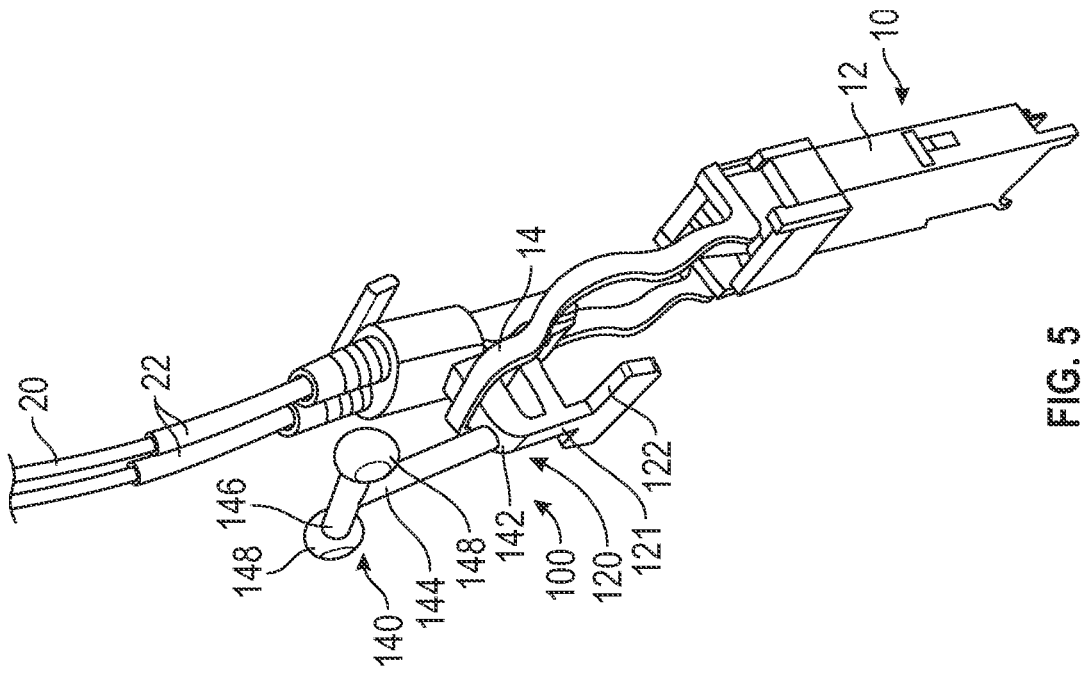
FIG. 5 illustrates the transceiver protection device catching the transceiver if dropped during detaching the transceiver from the cable.

FIG. 5 illustrates the transceiver protection device 100 catching the transceiver 10 if dropped during detaching the transceiver 10 from the cable 20. As the hanger 14 is received in the catch component 140, the catch component 140 catches the hanger 14 to prevent undesired falling and/or damage to the transceiver 10 if inadvertently detached. Accordingly, regardless of if the user is present or not present, if the transceiver 10 detaches from the cable 20, the transceiver 10 does not drop and become damaged as the hanger 14 is caught by the catch component 140. The user can then safely remove the transceiver 10 from the transceiver protection device 100.

Figure 6B:
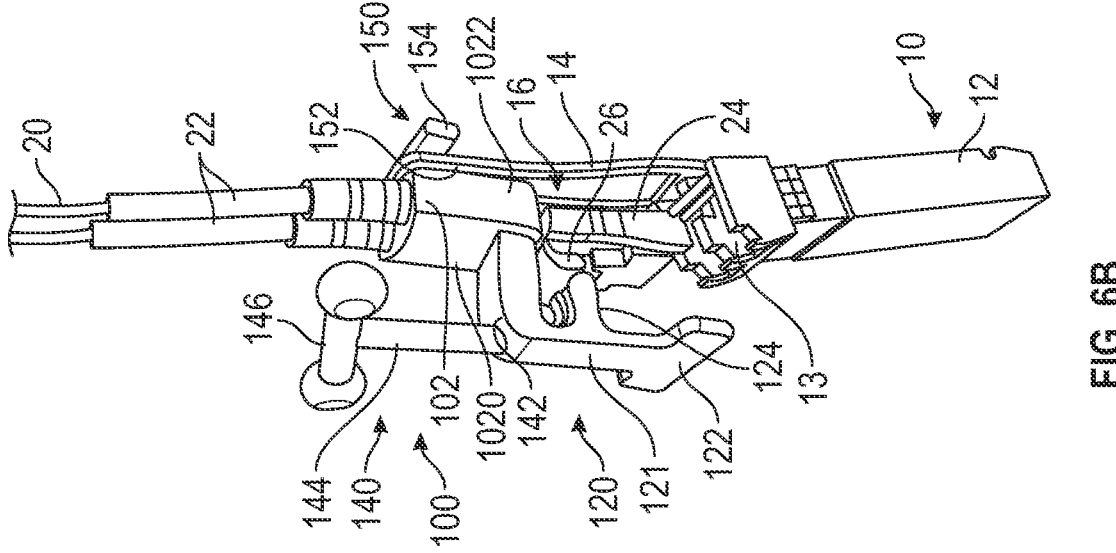
FIGS. 6A and 6B illustrate detaching of the transceiver protection device with the cable from another example of the transceiver.
Figure 6A:
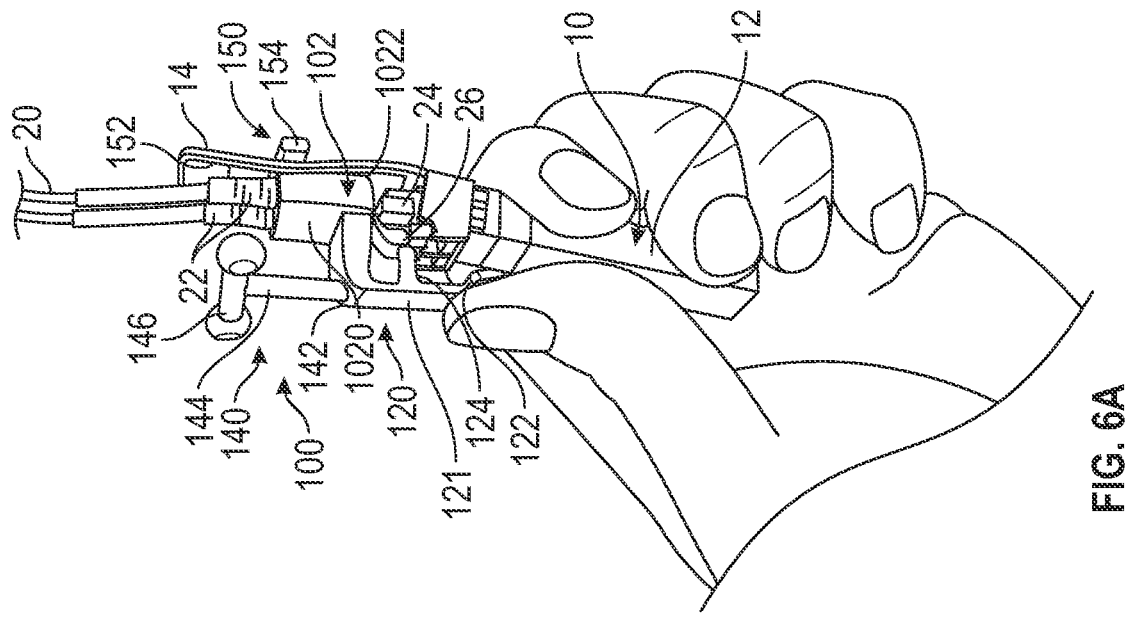

FIGS. 6A and 6B illustrate detaching of the transceiver protection device 100 with the cable 20 from another example of the transceiver 10. In some examples, the hanger 14 of the transceiver 10 may have a different orientation. To accommodate that, in some examples, the transceiver protection device 100 may include a second catch component 150. The body 102 can include a first surface 1020 and a second surface 1022 opposite the first surface 1020. The catch component 140 can extend from the first surface 1020 of the body. The second catch component 150 can extend from the second surface 1022 of the body 102. Accordingly, the second catch component 150 can extend from the body 102 opposite the first catch component 140.

The second catch component 150 can function substantially similar to the first catch component 140 as described herein. The second catch component 150 can be operable to be received in the aperture 16 formed by the hanger 14 of the transceiver 10. The second catch component 150 can include a hook which can be formed by a horizontal arm 152 extending from the second surface 1022 of the body 102 and a vertical arm 154 extending at an angle from the horizontal arm 152.

In at least one example, the angle between the horizontal arm 152 and the vertical arm 154 can be between about 20 degrees and about 160 degrees. In some examples, the angle can be between about 50 degrees and about 130 degrees. In some examples, the angle can be between about 70 degrees and about 110 degrees. In some examples, the angle can be about 90 degrees. The angle is sufficient so that the hanger 14 can be received in the hook formed by the horizontal arm 152 and the vertical arm 154, and the hanger 14 is not undesirably released from the second catch component 150. Accordingly, the second catch component 150 can catch and retain the hanger 14 if the transceiver 10 is detached from the cable 20 without being held. The transceiver 10 can then hang from the second catch component 150 of the transceiver protection device 100 (and the cable 20) until the transceiver 10 is safely removed from the transceiver protection device 100, for example by a user, to avoid damage to the transceiver 10.

The embodiments shown and described above are only examples. Even though numerous characteristics and advantages of the present technology have been set forth in the foregoing description, together with details of the structure and function of the present disclosure, the disclosure is illustrative only, and changes may be made in the detail, especially in matters of shape, size and arrangement of the parts within the principles of the present disclosure to the full extent indicated by the broad general meaning of the terms used in the attached claims. It will therefore be appreciated that the embodiments described above may be modified within the scope of the appended claims.

What is claimed is:

1. A transceiver protection device comprising:
a body operable to be coupled with a cable, wherein the cable is operable to be coupled, via a connector of the cable, to a transceiver;
a detach component operable to receive a detach force to detach the cable from the transceiver, wherein the detach component extends from the body such that the detach component is adjacent to the transceiver when the cable is coupled with the transceiver; and
a catch component extending from the body, the catch component operable to be received in an aperture formed by a hanger of the transceiver, wherein the catch component includes a horizontal arm extending from the body and a vertical arm extending at an angle from the horizontal arm.

2. The transceiver protection device of claim 1, wherein the detach component includes a push portion operable to impart the detach force against the connector of the cable to detach the cable from the transceiver.

3. The transceiver protection device of claim 1, wherein the catch component includes a hook.

4. The transceiver protection device of claim 1, wherein the catch component further includes a transverse arm extending transverse from the vertical arm.

5. The transceiver protection device of claim 1, wherein the detach component extends from the catch component.

6. The transceiver protection device of claim 1, wherein the body includes a first surface and a second surface opposite the first surface, wherein the catch component extends from the first surface of the body, wherein a second catch component extends from the second surface of the body.

7. The transceiver protection device of claim 6, wherein the second catch component is operable to be received in an aperture formed by a hanger of the transceiver.

8. The transceiver protection device of claim 6, wherein the second catch component includes a hook.

9. The transceiver protection device of claim 6, wherein the second catch component includes a horizontal arm extending from the body and a vertical arm extending at an angle from the horizontal arm.

10. A system comprising:
a cable including a connector, the connector operable to be detachably coupled with a transceiver; and
a transceiver protection device operable to be coupled with the cable, the transceiver protection device including:
a body operable to be coupled with the cable;
a detach component operable to receive a detach force to detach the cable from the transceiver, wherein the detach component extends from the body such that the detach component is adjacent to the transceiver when the cable is coupled with the transceiver; and
a catch component extending from the body, the catch component operable to be received in an aperture formed by a hanger of the transceiver, wherein the catch component includes a horizontal arm extending from the body and a vertical arm extending at an angle from the horizontal arm.

11. The system of claim 10, wherein the detach component includes a push portion operable to impart the detach force against the connector of the cable to detach the cable from the transceiver.

12. The system of claim 11, wherein the connector includes a retaining latch, wherein the push portion is operable to impart the detach force against the retaining latch to detach the cable from the transceiver.

13. The system of claim 10, wherein the catch component includes a hook.

14. The system of claim 10, wherein the catch component further includes a transverse arm extending transverse from the vertical arm.

15. The system of claim 10, wherein the detach component extends from the catch component.

16. The system of claim 10, wherein the body includes a first surface and a second surface opposite the first surface, wherein the catch component extends from the first surface of the body, wherein a second catch component extends from the second surface of the body.

17. The system of claim 16, wherein the second catch component is operable to be received in an aperture formed by a hanger of the transceiver.

18. The system of claim 16, wherein the second catch component includes a horizontal arm extending from the body and a vertical arm extending at an angle from the horizontal arm.

19. A method of operating a transceiver protection device, comprising:

coupling a body of the transceiver protection device to a cable connected to a transceiver such that:

a detach component of the transceiver protection device extending from the body is adjacent to the transceiver; and a catch component of the transceiver protection device extending from the body is received by an aperture formed by a hanger of the transceiver, wherein the catch component includes a horizontal arm extending from the body and a vertical arm extending at an angle from the horizontal arm; and applying a detach force to the detach component effective to detach the cable from the transceiver.

20. The method of claim 19, wherein the applying the detach force to the detach component comprises imparting the detach force on a push portion of the transceiver protection device coupled with a connector of the cable to detach the cable from the transceiver.

\*   \*   \*   \*   \*